J. R. WATSON.
APPARATUS FOR USE IN PRODUCING SYNTHETIC AND CHEMICAL SUBSTANCES.
APPLICATION FILED JAN. 25, 1915.
1,169,893.
Patented Feb. 1, 1916.
2 SHEETS—SHEET 1.
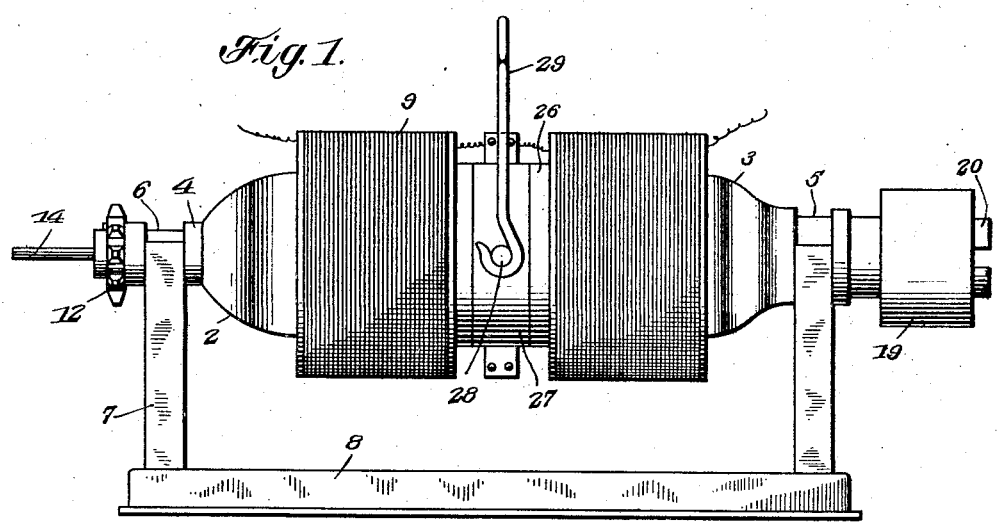
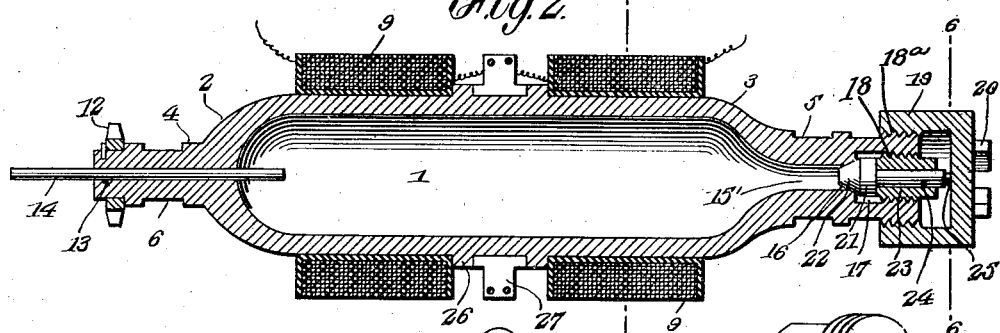
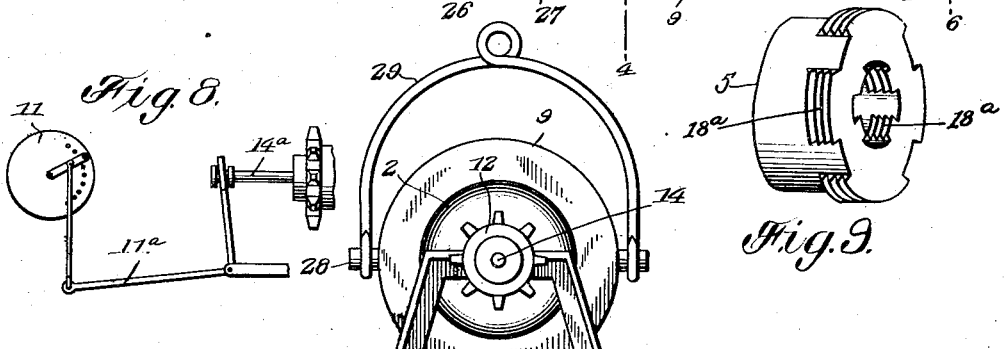
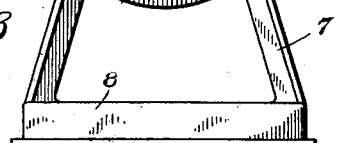
Witnesses
Inventor
J. R. Watson,
By Victor J. Evans
Attorney J. R. WATSON.
APPARATUS FOR USE IN PRODUCING SYNTHETIC AND CHEMICAL SUBSTANCES.
APPLICATION FILED JAN. 25, 1915.
1,169,893.
Patented Feb. 1, 1916.
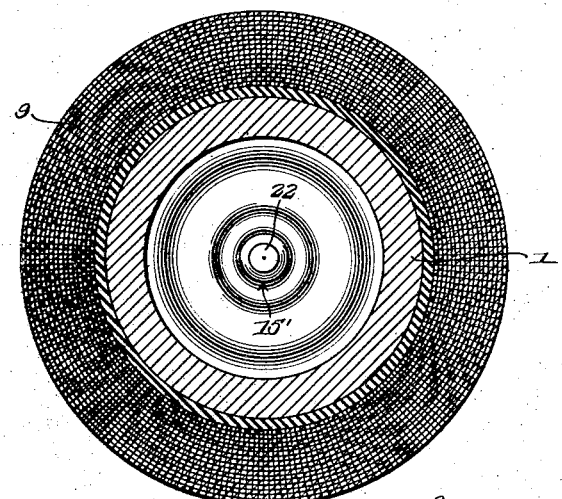
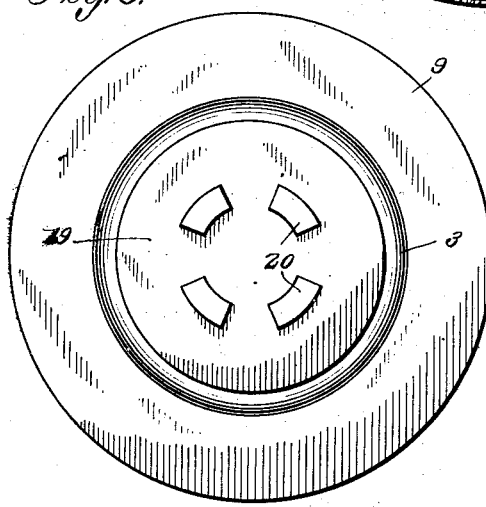
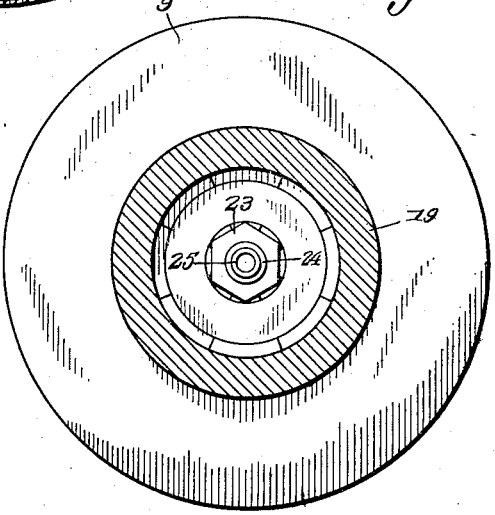
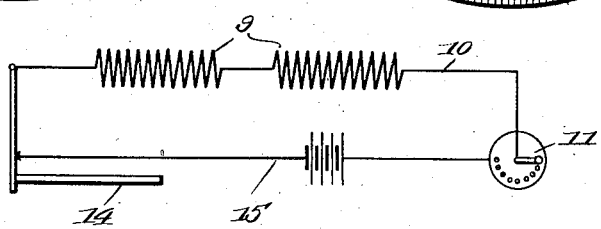

UNITED STATES PATENT OFFICE.

JOHN R. WATSON, OF BALTIMORE, MARYLAND.

APPARATUS FOR USE IN PRODUCING SYNTHETIC AND CHEMICAL SUBSTANCES.

1,169,893. Specification of Letters Patent. Patented Feb. 1, 1916.

Application filed January 25, 1915. Serial No. 4,317.

*To all whom it may concern:*

Be it known that I, JOHN R. WATSON, a citizen of the United States, residing in the city of Baltimore and State of Maryland, have invented new and useful Improvements in Apparatus for Use in Producing Synthetic and Chemical Substances, of which the following is a specification.

My invention relates to an apparatus designed especially for the manufacture of substances capable of being produced by synthesis, such as phenol, alpha naphthol, toluene, creosote, pyrocatechin, and other carbon compounds of similar nature, also alkalis and hydrochloric acid, etc., wherein the material under treatment is subjected to high temperature and pressure.

The object of the invention is to provide a retort of novel form and construction, adapted to be electrically heated, and wherein provision is made for controlling and regulating the heat automatically.

A further object of the invention is to provide a retort of great strength and durability, capable of being easily handled and agitated, and provided with means for closing its mouth which insures safety when the internal pressure exceeds a maximum degree.

The invention consists of the features of construction, combination and arrangement of parts herein fully described and claimed, reference being had to the accompanying drawings in which:—

Figure 1 is a side elevation of a retort embodying my invention. Fig. 2 is a vertical longitudinal section through the retort body *per se*. Fig. 3 is an end elevation of the apparatus. Fig. 4 is a vertical transverse section on the line 4—4 of Fig. 2, through the retort body. Fig. 5 is an end view of the retort body. Fig. 6 is a section on the line 6—6 of Fig. 2. Fig. 7 is a diagrammatic view showing an electric circuit. Fig. 8 is a view showing a modification in the rheostat controlling means. Fig. 9 is a fragmentary perspective view of the mouth of the retort.

The retort comprises a body or flask 1, which is of a seamless character and is drawn from a metal capable of standing a high temperature and pressure. It is preferably in the shape of an elongated tubular cylinder, having contracted end portions 2 and 3 from which project extensions 4 and 5. These extensions are formed to provide similar journals 6 whereby the retort may be mounted for rotation upon bearing standards 7 extending upwardly from a base 8, the said base and standards forming a supporting frame.

Carried upon and insulated from the rotating retort body or cylinder are electric heaters 9, each consisting of resistance coils embedded within a suitable carrier, said coils being arranged within an electric supply circuit 10 in which is a controlling rheostat 11, governing the supply of electricity to the coils, as hereinafter described.

The end extension 4 of the retort carries a sprocket wheel or other gear element 12 whereby the retort may be rotatably driven from any suitable source of power, and the said extension 4 and the adjacent end 2 of the retort are bored, as at 13, for the reception and passage of a thermocouple tube or other form of thermostat 14 controlling an electric circuit 15 governing the rheostat 11, by which this instrument is adjusted or influenced to vary the supply of current to the heating coils, so that safety will be secured by automatically regulating or varying the heat according to the internal temperature of the retort, as will be readily understood. As shown in Fig. 8, I may provide a bell crank lever 11ª, one arm of which is coupled to the switch member of the rheostat, and the other arm of which is coupled to a stem or projection 14ª from the adjacent end of the cylinder, whereby the thermostat will be governed by the expansion and contraction of the cylinder itself, to govern the supply of current to the heating unit. In practice, the electric circuit in which the resistances are arranged will include suitable means for maintaining an electrical connection with said resistances when the retort is rotated, such as suitable conducting rings and brushes or other conducting elements of the kind usually employed under such conditions.

The end 3 of the retort is formed to provide a mouth or filling and discharge passage 15′ which is formed with a tapered seat 16, is enlarged beyond the seat to form an annular chamber or cavity 17, and is provided beyond said cavity with coarse threads 18, similar to the spiral threads or rifling of a gun breech. The extremity of the portion 5 is formed with external threads 18ª of the same type to receive a cap 19 having external lugs or projections 20 by which it may be engaged by a spanner wrench or other suitable tool and turned on or off. A closure plug 21 is provided with a tapered end 22 to fit against the seat 16 and seal the flask or retort in a secure manner. This plug may be made of a resistant metal, and is held in position by means of a screw plug 23 which is threaded or rifled to engage the threads 18, and thus holds the plug 21 firmly applied.

The screw plug 23 is bored for the passage of a stem 24 which extends through the same and bears at its opposite ends against the seated plug 21 and the body of the cap 19. This stem is made of an alloy which is softer than the metal or metals of which the retort, plugs and cap are made, and also of greater expansibility and contractibility, and which is provided at its outer end with a reduced annular bearing portion 25 arranged to engage the body of the cap, whereby it is normally held from endwise movement. When the temperature within the retort reaches a predetermined degree, this stem expands and takes up the space between the tapered plug and cap and assists the plug 23 in holding the tapered plug in position. When, however, the temperature and pressure within the retort exceed the maximum, the excess expansion of the stem and yielding action of the plugs under the pressure, bring an excess pressure to bear upon the slender annular bearing portion 25, by which the latter is flattended out or crushed, thereby decreasing the length and resistance of the safety stem and permitting the tapered plug to partially open and the excess pressure to vent through the threaded surfaces between the retort and threaded plug and cap, thus obviating liability of a possible explosion and at the same time giving warning so that measures may be taken to reduce the temperature and pressure to points below the danger limit.

The retort body is provided on opposite sides of its center with bands 26 welded or shrunk thereon and between which is placed a sectional collar 27 having trunnions 28 adapted to be engaged by the hooked arms of a bail 29 whereby the device may be raised and lowered, tilted and otherwise handled from a crank or other suspending device, it being understood, of course, that the retort may be rotated or oscillated through the medium of the gear 12 from a suitable source of power for the purpose of agitating the contents thereof as required.

As before stated, the retort is primarily designed and adapted for use in making synthetic substances or compounds which are manufactured under high temperature and pressure, and in which it is desirable to secure safety and efficiency as material factors. It will be evident that my invention not only provides a retort which is capable of standing high temperatures and pressures, but which additionally secures safety in the provision of automatic heat regulating means and also in the provision of temperature and pressure controlled means for closing the mouth of the retort and forming a vent under abnormal conditions. Furthermore, the device may be also conveniently manipulated and easily and conveniently operated to agitate the contents during the course of treatment.

I claim:—

1. A retort of the character described comprising a rotating retort body having end journals, one of said journals being bored to form a mouth, sealing means for said mouth, means for electrically heating the retort body, said means including a controlling circuit, and means coöperating with the other end journal of the retort body and governed by the temperatures of the retort for controlling the supply of current through said circuit.

2. A retort of the character described comprising a rotating retort body having end journals, one of said journals being bored to form a mouth, sealing means for said mouth, said sealing means being rendered inoperative for sealing action when a certain pressure is exceeded in said retort, to permit the excess pressure to vent, means for electrically heating the retort body, said means including a controlling circuit, and means coöperating with the other end journal of the retort and governed by the temperature of the retort for controlling the supply of current through said circuit.

3. A retort of the character described including a seamless retort body, said body being disposed in a horizontal plane and having extensions forming end journals, one of said extensions being bored to provide a mouth, means for sealing said mouth, electrical means for heating the retort body, thermostatically controlled means associated with the retort body for governing said electrical heating means, means for rotating the retort body, and a frame having bearings receiving said retort journals and in which said journals are mounted to revolve.

4. A retort of the character described comprising a seamless retort body, said body being disposed in a horizontal plane and having extensions forming end journals, one of said journals being bored to form a mouth, a closure for said mouth, means for electrically heating the retort body, means for rotating said body, a frame in which the journals of the retort body are mounted to revolve, and means for thermostatically governing said heating means.

5. A retort of the character described including a seamless retort body, said body being disposed in a horizontal plane and having extensions forming end journals, one of said extensions being bored to provide a mouth, means for sealing said mouth, electrical heating means about the retort body, a controlling circuit associated therewith, means coöperating with the other end journal of the retort for governing said circuit to vary the supply of electric current to the heating means according to the temperature of the retort, means for rotating said retort, and a frame having bearings receiving said retort journals and in which said journals are mounted to revolve.

6. A retort of the class described comprising a body having end extensions forming journals, said extensions being bored, one of said extensions forming a mouth, means for closing said mouth, a thermostatic device extending through the bore in the other end extension, electrical heating means, a rheostat governing said heating means and controlled by said thermostat, and a frame in which the journals are mounted to revolve.

7. A retort comprising a retort body having end extensions forming journals, one of said end extensions having a bore and forming a mouth, a closure for said mouth, a thermostatic device extending into the retort through the other end extension, a gear element upon the latter-named extension whereby rotary motion may be applied to the retort from a suitable power source, and electrical heating means connected with the retort and controlled by said thermostat.

8. A retort of the character described comprising a seamless retort body, a frame in which said body is mounted to revolve in a horizontal plane, said body having extensions forming end journals rotating in bearings in said frame, one of said end journals being bored to form a mouth, a combined seal and pressure controlled vent device closing said mouth, means for electrically heating the rotating body, means for rotating said body, and means coöperating with the other end journal of the body for thermostatically governing said heating means.

9. A retort of the character described including a frame having open bearings, a horizontally disposed retort body provided with end journals mounted in said bearings, one of said journals being bored to form a mouth, a combined pressure controlled seal and vent closing said mouth, electrical heating means for the body, means coöperating with the other end journal of the retort for controlling the supply of current to the heating means, and means upon the retort body for the connection therewith of hoisting means, whereby said body may be lifted from its bearings.

10. A retort of the character described including a frame, a horizontally disposed retort body provided with end journals revoluble in said frame, one of said journals being bored to form a mouth, a combined pressure controlled seal and vent closing said mouth, electrical heating means for the body, and thermostatically controlled means for governing the supply of current to the heating means.

In testimony whereof I affix my signature in presence of two witnesses.

JOHN R. WATSON.

Witnesses:
E. W. STEEVES,
R. B. WATSON.